United States Patent [19]

Howard

[11] Patent Number: 5,751,859

[45] Date of Patent: May 12, 1998

[54] COMPRESSION OF TEXT IMAGES BY SOFT PATTERN MATCHING

[75] Inventor: Paul Glor Howard, Morganville, N.J.

[73] Assignee: Lucent Technologies Inc., Murray Hill, N.J.

[21] Appl. No.: 490,215

[22] Filed: Jun. 14, 1995

[51] Int. Cl.⁶ .............................. G06K 9/36; G06K 9/46; H03M 7/00
[52] U.S. Cl. ............................ 382/238; 341/107; 382/232
[58] Field of Search .................................... 382/239, 243, 382/246, 247, 232, 238; 341/51, 73, 94, 107; 358/261.2, 430, 431, 432

[56] References Cited

U.S. PATENT DOCUMENTS

| | | | |
|---|---|---|---|
| 4,463,386 | 7/1984 | Goddard et al. | 358/261.3 |
| 4,785,356 | 11/1988 | Gonzales et al. | 358/430 |
| 5,020,121 | 5/1991 | Rosenberg | 382/238 |
| 5,142,283 | 8/1992 | Chevion et al. | 341/107 |
| 5,475,388 | 12/1995 | Gormish et al. | 341/107 |

OTHER PUBLICATIONS

P.G. Howard et al., "Arithmetic Coding for Data Compression", *Proc. of the IEEE 82*, Jun. 1994, pp. 857–865.

I. H. Witten et al., *Managing Gigabytes: Compressing and Indexing Documents and Images*, Chapter 7, Van Nostrand Reinhold, New York, 1994.

E. Mohiuddin et al., "Lossless Binary Image Compression Based on Pattern Matching", *Proc. Intl. Conf. on Computers, Systems & Signal Processing*, Bangalore, India, 1984, pp. 447–451.

R. N. Ascher et al., "A Means for Achieving a High Degree of Compaction on Scan-Digitized Printed Text", *IEEE Trans. Comput.* C-23, Nov. 1974, pp. 1174–1179.

*Primary Examiner*—Leo Boudreau
*Assistant Examiner*—Wenpeng Chen
*Attorney, Agent, or Firm*—Stephen M. Gurey

[57] ABSTRACT

Bilevel textual images are compressed by segmenting the image into marks (401) and then coding each mark using a soft pattern matching method. Each mark is compared (403) with the marks in a library of marks and if an acceptable match is found (404), the index of the matching mark is coded (412). Each pixel in a current mark is then coded using a statistical coder that codes each pixel based on the value of the pixel and a set of probabilities of all sample values based on a context that consists of pixels in the current mark and pixels in the matching mark (414, 415, 416, 417). In order to reduce the overall bit count of the image, pixels which are poorly predicted (i.e., pixels black [or white] in value, but whose context makes them more likely to be white [or black])) (705) are color-reversed (706, 709) prior to coding, if so doing will not perceptibly alter a reconstructed image (708). If a matching mark is not found among the marks in the library, each pixel in the mark is coded using a statistical coder using a context of pixels in the non-matching mark (406, 407, 408, 409, 410). Again, pixels which are poorly predicted (721) are color-reversed (722, 725) prior to coding if the reversed pixels will not perceptibly alter the image (724).

18 Claims, 6 Drawing Sheets

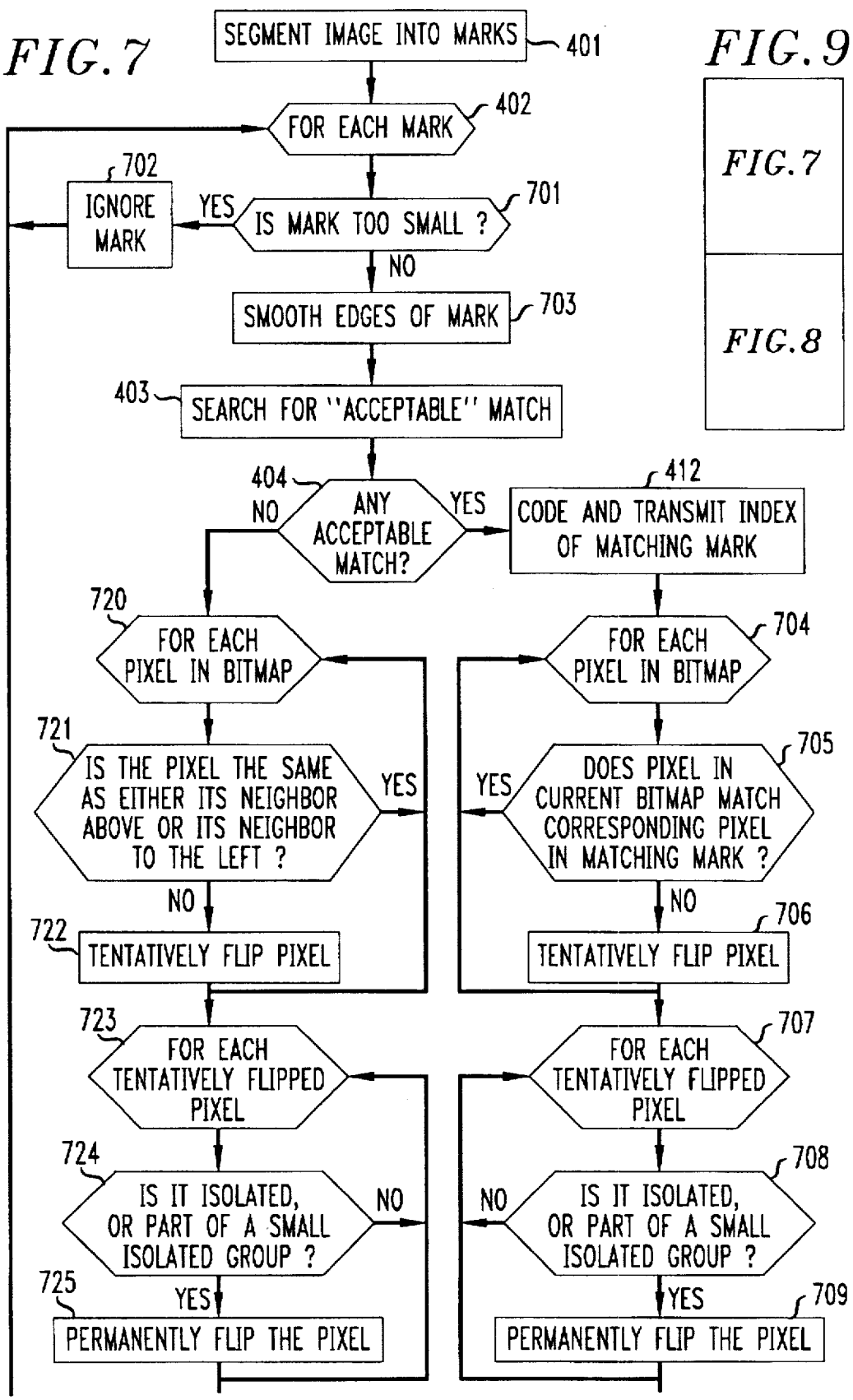

COMPRESSION OF TEXT IMAGES BY SOFT PATTERN MATCHING

TECHNICAL FIELD

This invention relates to the compression of bilevel images that consist mainly of printed or typed text.

BACKGROUND OF THE INVENTION

Compressing bilevel images that consist mainly of printed or typed text is a problem that has been addressed in the prior art for different coding applications. For example, current facsimile technology involves scanning and transmitting bilevel images. There is also a growing need for archiving document collections, often most efficiently done by scanning and storing bilevel images. For both of these applications, the material consists mainly of text, with occasional halftones and other types of images. Currently, images are usually scanned at resolutions of between 100 and 800 dots per inch (dpi). Since even at the comparatively low resolution of 200 dpi, a single page contains over 4,000,000 pixels (i.e., bits), the need for compression is obvious.

Compression can be characterized as being either lossless or lossy. In lossless compression, once an image is scanned, every pixel in the image that is reconstructed from the transmitted and received bit stream is identical to the corresponding image in the scanned image. In lossy compression, some pixels in the reconstructed image may in fact be different, although it is expected that to a human observer the reconstructed image will look essentially identical to the scanned image. By using various compression algorithms, lossless compression can give compression ratios of between 10:1 and 40:1 for text documents at 200 dpi. Lossy compression has the potential for compression ratios about 2 to 3 times as large. Prior art compression techniques for bilevel images thus fall into two categories: (1) lossless compression of arbitrary images, and (2) lossy compression of textual images.

Most prior art techniques for compressing bilevel images are lossless. Two basic approaches have been taken: run length coding and arithmetic coding. Run-length based techniques make use of the fact that large parts of most bilevel images consist of white space and that, for text images, the strokes that make up the characters are several pixels wide and many pixels long. CCITT Group 3 (G3) and Group 4 (G4) facsimile standards (CCITT, "Standardization of Group 3 Facsimile Apparatus for Document Transmission," Red Book, Fascicle VII.3, Rec. T.4, 1980; and CCITT, "Facsimile Coding Schemes and Coding Control Functions for Group 4 Facsimile Apparatus," Red Book, Fascicle VII.3, Rec. T.6, 1980) call for coding a scan line as an alternating sequence of runs of white and black pixels, the lengths of the runs being coded using Huffman codes. Most facsimile machines in use today operate under either the G3 or G4 standard.

The ISO/IEC JBIG standard for lossless bilevel image compression (see, e.g., JBIG, "Progressive Bi-level Image Compression," ISO/IEC International Standard 11544, 1993) uses arithmetic coding. Arithmetic coding is a well-established statistical coding technique that compresses a sequence of data optimally with respect to a probabilistic model. Its mechanism is to recursively partition the interval [0,1) of the real line into subintervals whose lengths are proportional to the probabilities of the sequence of events they represent. After the subinterval corresponding to the actual sequence of data is known, the coder outputs enough bits to distinguish that subinterval from all others. Methods are available that permit limited precision arithmetic and incremental transmission. If probabilities are known for the possible events at a given point in the sequence, an arithmetic coder will use almost exactly $-\log_2 p$ bits to code an event whose probability is p. Thus, if the probability of each of two events is equal, one bit is used to code either. If, however, the probability of one event occurring is greater than the other, less than one bit is used to code the more likely event and greater than one bit is used to code the less likely event. The encoder and decoder can be thought of as black boxes that use the probability information to produce and consume a bit stream. Arithmetic coding is described in publications such as "Arithmetic Coding for Data Compression," by the inventor herein and J. S. Vitter, Proc. of the IEEE 82 (June 1994), 857–865

With arithmetic coding, it does not matter to the encoder and decoder where the probabilities come from or how they change as long as the decoder has access to the same set of probabilities to decode an event that the encoder used to encode it. A different set of probabilities can be used for each event, allowing conditioning of the coding of an event on the context in which it occurs. This requires the encoder and decoder to maintain a separate set of probabilities for each conditioning class.

The JBIG standard specifies both progressive and non-progressive modes. In the non-progressive mode coder pixels are coded in raster scan order. Each pixel is coded using an approximate binary arithmetic coder, known as the QM-Coder. The coder requires an estimate of the probability that the pixel being coded is black (or white). In JBIG this probability is estimated adaptively for each of a number of conditioning classes; the conditioning classes are based on the values of ten previously coded nearby pixels. The ten values taken together form a 10-bit vector that can take on $2^{10}=1024$ different values; thus there are 1024 different conditioning classes, or contexts. Each pixel is coded by the QM-Coder, which uses the probability estimate for the pixel's context, then updates the estimate.

The QM-Coder used in the JBIG standard provides both an approximate arithmetic coder and a table-driven technique for updating the probability estimate for each event's context after the event is coded; probability estimation is linked to coding both to increase speed and to use the coder as a source of pseudo-random bits. At each point in the coding, the probability estimate is in one of 226 states that represent (1) the probability of one of the two possible symbols (black or white) in the given context, and (2) the confidence in the estimate. After the symbol has been coded using a close approximation to arithmetic coding, the probability estimate for its context may be changed depending on the actual symbol and possibly on an unrelated (i.e., pseudo-random) event internal to the coder. The combined mechanism of probability estimation and approximate arithmetic coding comprise the QM-Coder, which is fast and easily implemented in software or hardware.

FIG. 1 is a flowchart for the prior art JBIG encoder. After coding the dimensions of the image at step 101, the image is scanned pixel by pixel in raster scan order. For each pixel (step 102), its context is found based on the black/white values of the surrounding ten pixels. FIG. 2 shows the template used as the context for the pixel marked "P". The ten numbered pixels are used as the context to determine the probability of the value of pixel P. Thus in step 103, the context of the pixel being coded is determined and, based on its context, the probability of the value (black or white) of P is accessed in a look-up table (step 104). The QM-Coder is then used to code and transmit the value of pixel P (step 105) using the probability of the pixel's value, together with the actual value of P. Then, based on the actual value of P, the context probability is updated (step 106). At the receiving end, a similar process is used to decode the received bit stream and reconstruct the pixel values and thus the image. The context values necessary to decode the arithmetically coded bitstream are continuously updated in parallel with the transmitted end in accordance with the received pixel values.

Rather than coding a textual image into pixels and coding the image pixel-by-pixel using any of the above-described lossless techniques, lossy techniques for compressing text images using pattern matching and substitution (PM&S) have also been investigated (see, e.g., R. N. Ascher & G. Nagy, "A Means for Achieving a High Degree of Compaction on Scan-Digitized Printed Test," *IEEE Trans. Comput.* C-23 (November 1974), 1174-1179; and I. H. Witten, A. Moffat & T. C. Bell, *Managing Gigabytes: Compressing and Indexing Documents and Images*, Chapter 7, Van Nostrand Reinhold, N.Y., 1994).

Generally, with PM&S, the image is segmented into individual characters and the set of characters is partitioned into equivalence classes, each class ideally containing nothing but all the occurrences of a single letter, digit, or punctuation symbol. Coding the image consists of coding the bitmap of a representative instance of each equivalence class, and coding the position of each character instance along with the index of its equivalence class. The equivalence classes and representatives can be constructed adaptively.

FIG. 3 is a flowchart detailing the steps of a generic prior art PM&S encoder. At step 301, the image is segmented into marks (i.e., connected groups of black pixels). For each mark (step 302), a comparison is made with all the marks in a library of marks. Specifically, a pixel-by-pixel comparison is made between the current mark to be coded and transmitted and the pixels in each mark in the library to determine whether, based on some criteria, an acceptable match can be found (step 303). If a match is found at step 304, the index of the matching mark is coded and transmitted (step 305) indicating which previously encountered mark the present mark appears to match. In addition, the position of the mark on the page, defined as an offset relative to the previous mark on the page, is coded and transmitted (step 306). If an acceptable match is not found at step 304, then the bitmap dimensions of the current mark are coded and transmitted together with the bitmap of the mark itself in raster scan order (step 307). The mark is then added to the library of marks (step 308) for later comparisons with other marks on the page. The offset location of the mark is also coded and transmitted (step 306), as in the case when a match was found. Mark-by-mark, the page is coded and transmitted, the library of marks being built up as the marks of the page are processed one after another.

The various PM&S methods differ primarily in the matching technique employed. The significant drawback to prior art PM&S methods is the likelihood of substitution errors. In order to obtain good compression ratios, the pattern matcher must be aggressive in declaring matches, but as the matching criteria become less stringent, mismatches inevitably occur. A human reader can often detect and correct such errors (consciously or unconsciously), as for example, between an 'a' and an 's'. Sometimes, however, this is not possible. Part numbers in images inherently have no context, and the FIGS. '5' and '6', for example, can be problematic even when the context is available. The difficulty is that it is not desirable to include typeface-specific or even alphabet-specific information in a general-purpose coder, but in most alphabets there are confusion pairs—different alphabet symbols that are similar according to most easily implemented matching criteria.

An object of the present invention is to code bilevel textual information with both a high compression ratio and a high degree of accuracy.

SUMMARY OF THE INVENTION

In accordance with the present invention, high compression of bilevel textual material is achieved through a soft pattern matching (SPM) method that combines the features of both the non-progressive JBIG encoder and the PM&S methods. As in the PM&S methods, the image is segmented into marks, which are connected components of black pixels. Each pixel is coded using a JBIG-like context of nearby pixels in conjunction with the QM-Coder, which is the arithmetic coder used in JBIG. Pattern matching is used, not for directly substituting the matched character as in the PM&S methods, but to improve the context used by the coder in coding the pixels within the mark. High compression is achieved in a lossy mode whereby pixels are selectively reversed to their opposite value if and only if doing so reduces the code length without introducing any "significant" changes to the image. Specifically, isolated or nearly isolated pixels that are poorly predicted (i.e., white pixels whose probability of being white based on their context is less than one-half, or black pixels whose probability of being black based on their context is less than one-half) are color-reversed, thereby reducing the code length of the pixel and overall bit count of the image.

BRIEF DESCRIPTION OF THE DRAWINGS

FIG. 7 and 8 when placed together as illustrated in FIG. 9 show a flowchart for a lossy compression method of the present invention based on soft pattern matching.

DETAILED DESCRIPTION

Figure 4:
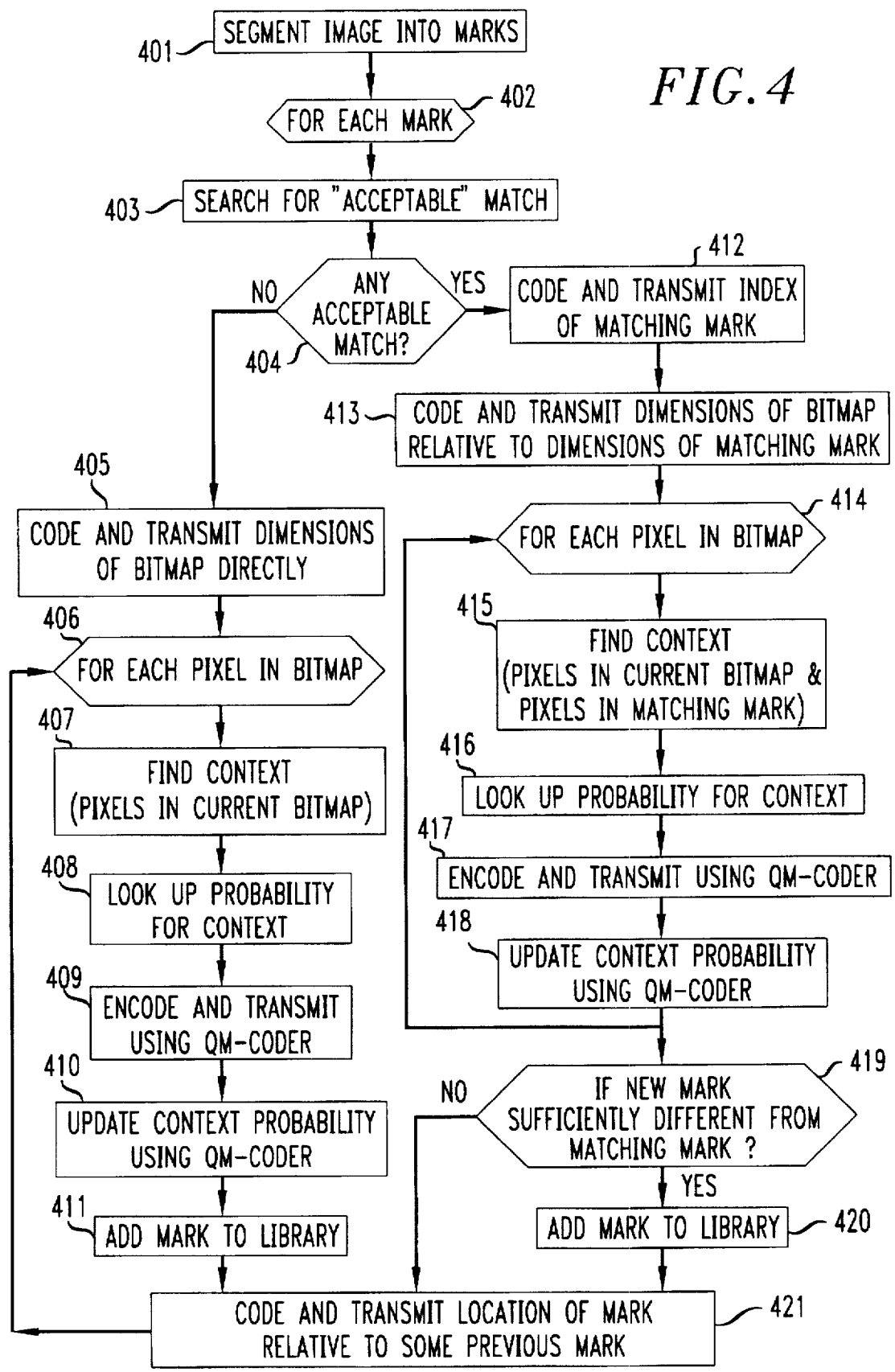
FIG. 4 is a flowchart of a lossless compression method of coding based on a soft pattern matching.

FIG. 4 shows a flowchart for a lossless compression coding method based on soft pattern matching. This method is applicable to images that consist mostly of printed or typed text and is similar to a method described in an article by K. Mohiuddin, J. J. Rissanen & R. Arps, entitled "Lossless Binary Image Compression Based on Pattern Matching," *Proc. Intl. Conf on Computers, Systems, and Signal Processing*, Bangalore, India, 1984. It is expected that any necessary preprocessing has been performed to remove non-textual matter such as halftone pictures, diagrams, handwriting and logos. This preprocessing step is not discussed further herein. The non-textual material should be coded by some other method, such as the aforedescribed JBIG. The SPM method, although capable of coding any such non-textual material that remains in the image, is not likely to achieve good compression efficiency.

The SPM method has a distinct advantage over the PM&S methods described hereinabove. As noted, in PM&S methods, a matching error leads directly to a character substitution error; PM&S methods can neither guarantee that there will be no mismatches nor detect them when they occur. The soft pattern matching method uses the matching mark only in the template to improve the prediction of each pixel's color (black or white). Using a totally mismatched mark in the template leads only to reduced compression, not to any errors in the final reconstructed image. If a mark is well matched, knowledge relating to the matched mark is taken advantage of in processing the pixels in the current mark.

As in the PM&S methods, the image is coded by marks, or connected components of black pixels. In step 401, therefore, the image is segmented into marks. Marks correspond roughly to letters, figures, and punctuation symbols although the correspondence is not exact because of ligatures (ff fi fl ffi ffl), multipart letters (ij), multipart punctuation marks (:;!?""%), accented letters (éö), non-Latin letters (Ξ), and multipart mathematical symbols (=≡≦≈), as well as because of false ligatures and broken characters created by the printing and scanning processes. Any standard segmentation technique can be used, such as a boundary-tracing method similar to one described in the aforenoted text by Witten, et al., p. 263 ff. Rather than 8-connected black components, however, 4-connected components are found, which breaks up some false ligatures, which are more of a problem than broken characters. Further, nested marks (⊙Ξ) are treated as single marks.

To reduce the amount of memory required and to deal gracefully with vertical lines, very large letters, diagrams, and other non-textual material, a form of image striping is used, arbitrarily limiting the vertical extent of extracted marks. Specifically, a buffer is maintained whose width is the width of the image, but whose height is some fraction (e.g., 5 percent) of the larger of the image width and image height, with a minimum of 64 lines. If an all-white scan line is encountered, the entire buffer is encoded and flushed. Otherwise, when the buffer is full, all marks that have black pixels in the top half of the buffer are extracted and coded. This flushes at least the top half of the buffer enabling processing to continue. A connected component whose height is more than the height of the buffer is coded in pieces as more than one mark.

One step in processing each mark is to encode its position as an offset relative to a previously encoded mark. This can be done more efficiently if the offsets are mostly small. To keep the offsets small, it is desirable to code marks at least approximately line by line, and left to right within each line. Finding text lines is complicated by letters with descenders, by dots on 'i' and 'j', and by skewing introduced in the scanning process.

The procedure for putting marks in coding order is as follows. Marks are sorted according to the position in raster scan order of the first pixel encountered. A tentative bottom scan line is located by finding the median of the bottom scan lines of the first 25 marks in the current list of unencoded marks. Then, all marks whose top scan line is at least as high as the tentative bottom scan line are selected and sorted according to their leftmost pixels. This method is designed for text oriented horizontally on the page, but it can handle vertical text with a loss of compression efficiency of less than 10 percent.

After the image is segmented into marks (step 401), for each next sequenced mark (step 402), an attempt is made to find an "acceptable" matching mark (step 403). Specifically, an attempt is made to find a previously coded mark that matches the current mark fairly closely, or in other words, is imperceptibly different. For each previously coded mark the following two steps are performed: (1) the potential matching mark is prescreened and skipped if its size (or some other easily computed characteristic) is not close to that of the current mark. For example, matching marks whose size in either dimension differs by more than two pixels from that of the current mark are rejected; and (2) a potential matching character is called the best match if a computed matching score is better than that of any other potential matching mark tested so far. For example, a score can be computed by counting the number of mismatched pixels between the potential matching mark and the current mark when they are aligned according to the centers of their bounding boxes. The potential matching mark with the lowest count is thus the best match.

After comparing the bitmap of the current mark with the bitmaps of marks in the library of marks, a decision is made (step 404) whether the best match is "acceptable" and that decision is coded using the QM-Coder with a single context, the acceptable match context. The best match is acceptable if its score is better than a prespecified threshold(i.e. determined to be imperceptibly different); the threshold may depend on characteristics of the current mark like its size. In a specific implementation, a match is accepted if the number of mismatched pixels is at most 21 percent of the number of pixels enclosed in the bounding box of the current mark. The compression ratio is not particularly sensitive to the value of this threshold.

Figures 1, 2:
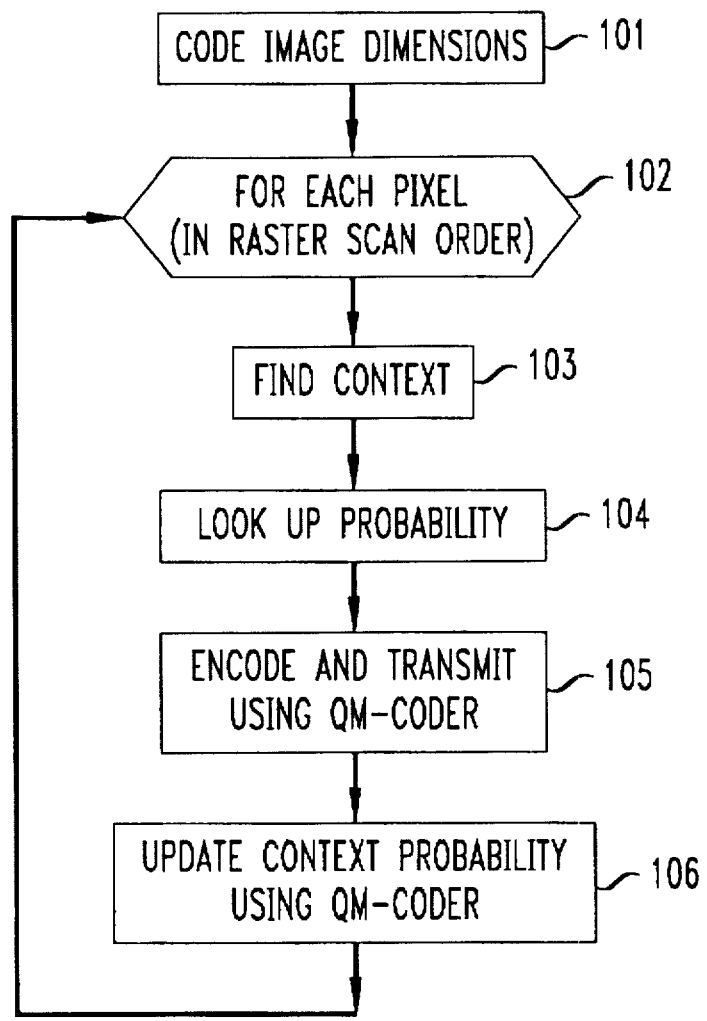
FIG. 1 is a flowchart of the method of coding used by a prior art JBIG encoder.
FIG. 2 is a template of pixels used as the context in predicting a pixel's color for the JBIG encoder of FIG. 1.
Figure 3:
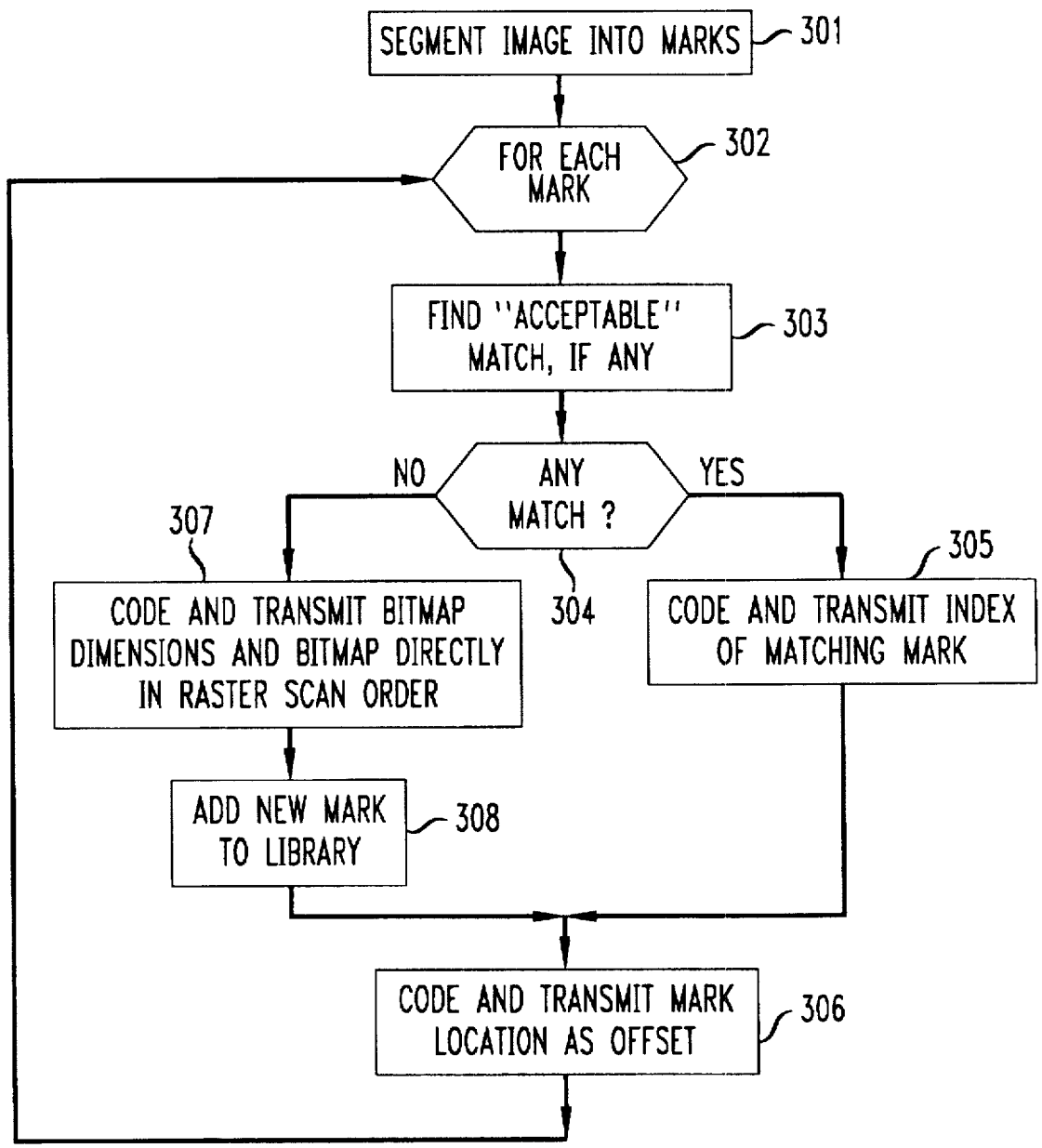
FIG. 3 is a flowchart of the method of a generic prior art PM&S encoder.

If no acceptable match is found, then the current mark is coded using a fixed template of nearby pixels. This is the same method used in JBIG coder described hereinabove, except that is being applied to a single mark, not to the entire image. Thus, the height and width of the mark's rectangular bounding box are coded using a multisymbol extension to the QM-Coder (step 405). The pixels within the mark's bounding box are then coded in raster scan order as in the JBIG coder. Thus, for each pixel in the bitmap (step 406), the 10-pixel context of FIG. 2 is found (step 407). For that particular context, the probability is looked up (step 408), and using that probability together with the actual value of the pixel, the pixel is encoded and transmitted using the QM-Coder (step 409). The context probability is then updated (step 410). After the mark is coded, it is added to the library of potential matching marks (step 411).

As noted above, a multisymbol extension to the QM-Coder is used to code the height and width of the mark's rectangular bounding box. When more than two symbols are possible at some point in a coding process, arithmetic coding is more difficult. By using an extension to the binary QM-Coder, any integer, positive, negative, or zero can be coded. This extension involves repeatedly using the QM-Coder, narrowing the range of possible values at each step. In effect, integers are put at the leaves of a binary tree and the binary QM-Coder is used to code the sequence of branches needed to reach the desired integer.

Figure 5:
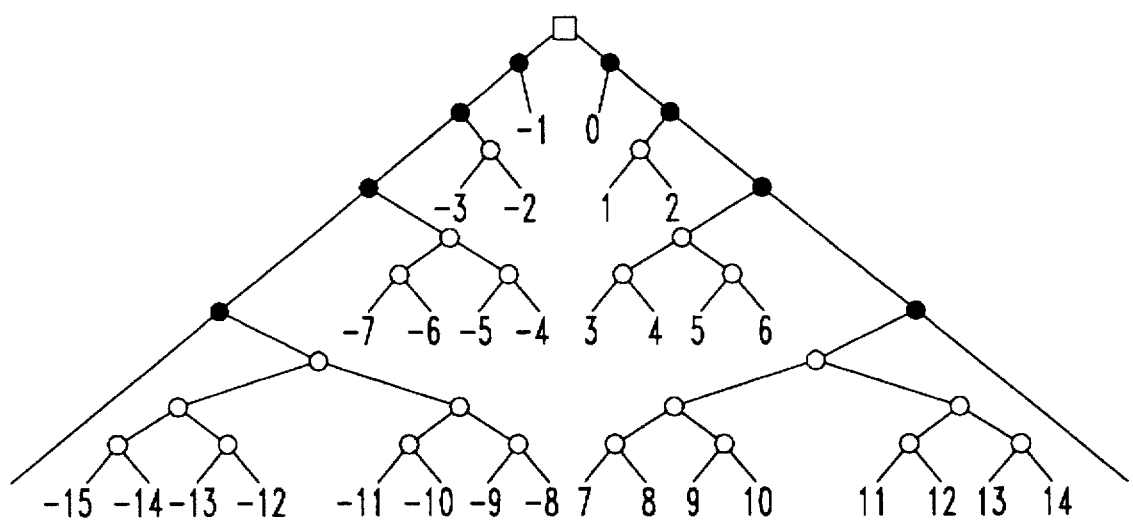
FIG. 5 is a binary tree used for a multisymbol extension to a coder used by the method of FIG. 4.

The described tree codes any integer n using fewer than $2\lfloor \log_2 |n| \rfloor + 2$ applications of the QM-Coder. Coding proceeds in three phases. The first phase consists of one decision, whether n is negative. In the second phase, an approximate range in which n lies is found by testing ranges of size 1, 2, 4, 8, 16, . . . . . If n is non-negative, it is tested to be in the ranges [0, 0], [1, 2], [3, 6], [7, 14], [15, 30], . . . . . . the ranges doubling in size at each step. If n is negative, it is tested to be in the ranges [−1, −1], [−3, −2], [−7, −4], [−15, −8], [−31, −16], . . . . Finally, in the third phase the value of n is coded within the range. Since the sizes of all ranges are powers of 2, a complete binary tree is used for this phase. Part of the tree is shown in FIG. 5. Each internal node represents one binary context with its own probability information, to be used by the QM-Coder. The square node at the root of the tree represents the first-phase decision, whether the integer n being coded is negative. The filled circles are the second-phase nodes, moving down the tree in ever-increasing ranges. The open circles represent third-phase decisions, traversing a complete binary (sub)tree to reach the specific value of n. Many other reasonable binary trees could also be used. Most of them have about the same amount of compression with about the same amount of computation. In particular, at least O(log n) binary choices for large values of n are needed.

Figure 6:
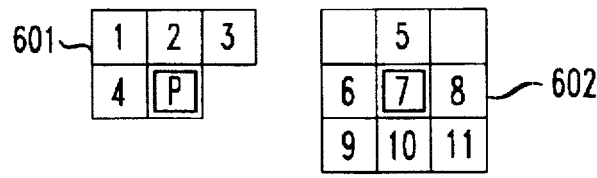
FIG. 6 is a template of pixels in both a current mark and its best matched mark used as the context in predicting a pixel's color in the method of FIG. 4.

If at step 404 an acceptable match between the current mark and a mark in the library of marks is found, the index of the matching mark is coded and transmitted using the above-described multisymbol extension to the QM-Coder (step 412). The bitmap of the current mark is then coded. First, the number of rows and number of columns of the current mark relative to the corresponding numbers for the matching mark are coded using the multisymbol extension to the QM-Coder (step 413). Then, after aligning the center of the current mark with the center of the matching mark, each pixel (step 414) within the bounding box of the current mark is coded using the QM-Coder as in JBIG, but with a different template. Specifically, in step 415, the context of a pixel is found based on a template that consists of a combination of some pixels from the causal region of the current mark (pixels already seen and coded) and additional pixels from the matching mark in the neighborhood of the pixel in the matching mark that corresponds to the current pixel. FIG. 6 shows the template for matched marks. The numbered pixels in block 601, representing the current mark, together with the numbered pixels in the matching mark in block 602, are used as the context for coding the pixel marked 'P'. The pixel numbered '7' in block 602 corresponds to pixel 'P' when the marks are aligned according to their centers. The eleven pixels in this template yield $2^{11}$=2048 different conditioning contexts. Since most of the pixels in the matching mark match those of the current mark (that is how the matching mark was selected), better predictions can be obtained by using some of the pixels in the matching mark, especially the pixel in the corresponding position, and hence obtain better compression.

After determining the pixel's context, the probability is looked up (step 416) and the pixel is encoded and transmitted using the QM-Coder (step 417) and the context probability is updated (step 418). After the mark is coded, it can be added to the library of potential matching marks. This can be done always, never, or conditionally based on the closeness of the match. The latter is shown as steps 419 and 420. An embodiment that adds the new mark conditionally will have improved coding speed over an embodiment that always adds the new mark to the library since the number of marks that must be tested as potential matches will be reduced. The compression obtained, however, might increase or decrease: reducing the number of possible matching marks reduces the number of bits required to identify the matching mark, but it also may prevent using some very closely matching marks from being declared matches in the coding process, increasing the number of bits required for encoding the bitmap.

The location of the mark is coded in step 421 both when an acceptable match is not found and the bitmap of the current mark is directly coded, and when an acceptable match is found and the bitmap of the current mark is coded using a context of pixels from the current and matching mark. The location of each mark is specified by coding its offset relative to another previously coded mark, usually but not always the most recently coded. For each mark after the first in a line, its horizontal offset is coded as the signed distance from the right edge of the previously coded mark to the left edge of the current mark. The vertical offset is coded as the signed distance from the median of the bottom edges of the last three marks to the bottom of the current mark. For the first mark on a line, the horizontal offset as the signed distance from the left edge of the first mark on the previous line to the left edge of the current mark is coded. The vertical offset is coded as the distance from the bottom edge of the first mark on the previous line to the top edge of the current mark. First the decision about the type of offset is coded using the multisymbol QM-Coder. All offsets are also coded using the multisymbol extension of the QM-Coder, with separate contexts for each combination of offset directions (horizontal or vertical) and reference mark (previous mark or first mark on previous line). The position of the first mark on a page is coded relative to the upper left corner of the page, using the previous-line offset context.

Figure 8:
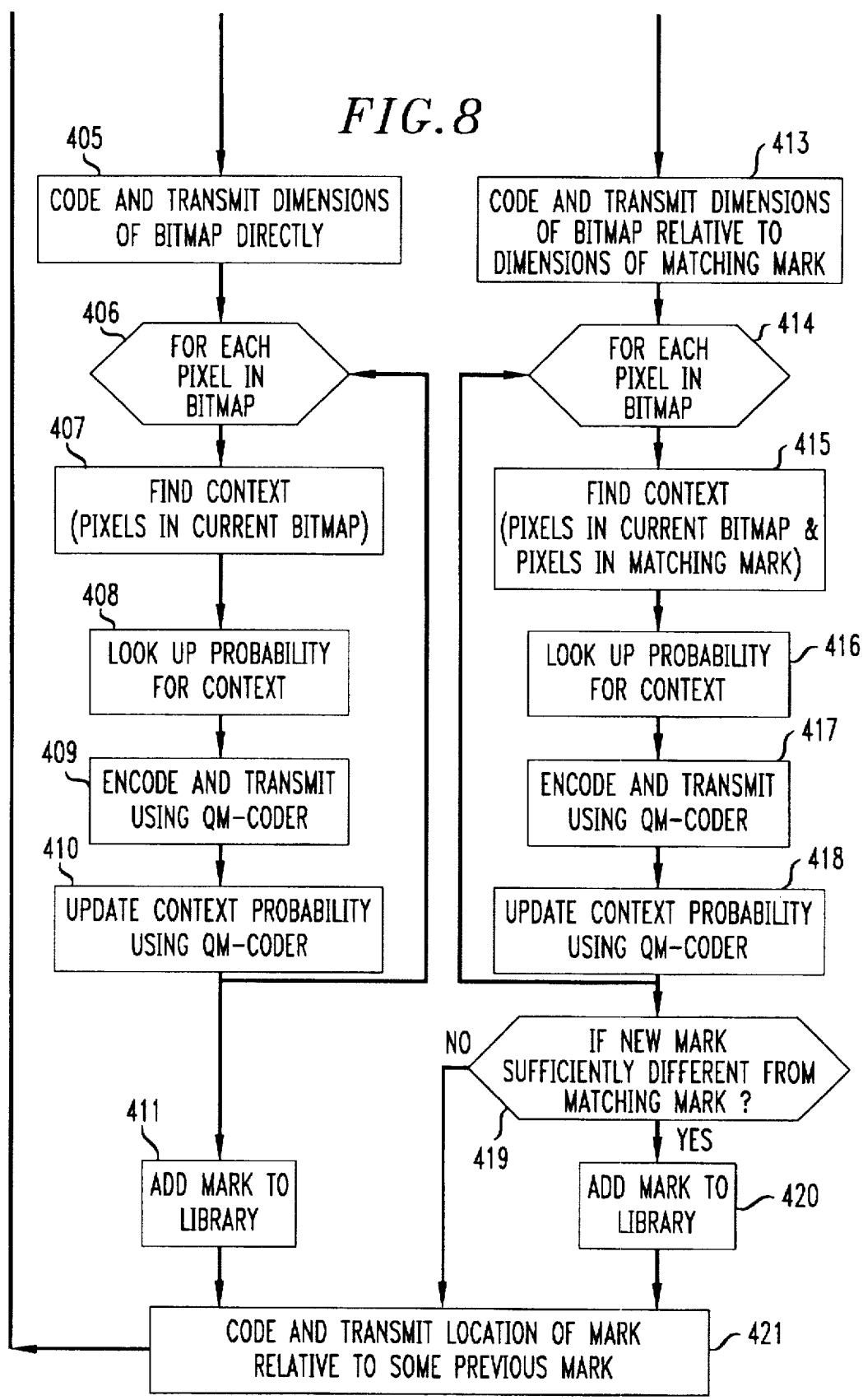

In accordance with the present invention, a significant increase in the compression ratio is achieved by making the above-described method lossy. As previously defined, "lossy" compression means that the reconstructed image does not exactly duplicate the original scanned image. That does not always imply that the reconstructed image has a poorer quality that the original document. In fact, in many instances, the appearance of the reconstructed image may be enhanced by preprocessing the scanned image to remove some of the deleterious side effects that the scanning process itself introduces. FIGS. 7 and 8 when placed together as illustrated in FIG. 9 show a flowchart detailing the lossy compression method of the present invention. This method is a modification of the above-described lossless method, illustrated in FIG. 4. Similar numerical designations are given to those processing steps in FIGS. 7 and 8 that correspond to the same steps in the lossless process of FIG. 4. Accordingly, only those additional steps that relate to the improvement obtained by lossy compression are described hereinbelow.

A first method for improving the compression ratio involves eliminating very small marks that represent noise on the page. Thus after the image is segmented into marks (step 401), a determination is made whether the mark is too small (step 701). If yes, then the mark is ignored (step 702) and the next mark is processed. In a specific implementation, only marks consisting of single black pixels surrounded by eight white pixels are ignored. Somewhat larger marks, up to approximately 0.01 inch in the larger dimension, could also be safely ignored. The size in pixels of the ignored marks would thus depend on the scanning resolution.

Further improvement in compression ratio is obtained by smoothing the edges of each mark before compressing it and thus before entering it into the list of potential matching marks. Jagged character edges are often the result of the scanning process. By removing these edges rather than coding and transmitting them, the reconstructed image will have an improved appearance. In step 703 the edges of the mark are smoothed prior to comparing the mark with the library of marks in step 403. Specifically, single protruding pixels (white or black) are removed along the mark edges. Smoothing has the effect of standardizing local edge shapes, which improves prediction accuracy and increases the number of matching pixels between the current mark and potential matching marks. An increase in compression ratio of about ten percent is achieved through this method.

Considerable improvement in compression is obtained by taking advantage of the best matching mark. As previously described, in arithmetic coding a code length of less than one bit is obtained if an event (e.g., a pixel's color) is predicted well (i.e., with probability greater than one-half), and greater than one bit if its color is not (i.e., with probability less than one-half). A mechanism for reducing the code length is to reverse the color of poorly predicted pixels (pixels whose color is opposite to what would be predicted for that pixel based on the surrounding pixels in the current and/or best matching mark) before coding them. To avoid seriously distorting the mark as a whole, however, reversal of pixel color is limited to places where such a reversal would be imperceptible. Reversal of single isolated poorly predicted pixels, and in fact, reversing groups of two isolated pixels causes a minor perceived difference.

Figure 10:
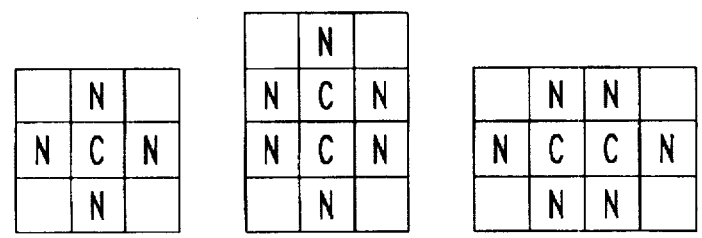
FIG. 10 shows a bitmap used by the lossy compression method of the present invention to determine whether candidate pixels for color reversal are isolated in a mark and should actually be reversed before the mark is coded.

After the best match for a current mark is determined and the index of the matching mark is coded (step 412), each pixel in the bitmap for the current mark is examined (step 704). Since the mismatch information is needed before coding the pixels to obtain isolation information, an approximation of the prediction of each pixel is determined by the color of the aligned pixel in the best matching mark. If the pixel in the bitmap of the current mark matches the corresponding pixel in the matching mark, then the pixel is considered to be well predicted, and poorly predicted if otherwise (step 705). If poorly predicted, the pixel is tentatively flipped (step 706). Once the entire bitmap of the mark is processed, for each tentatively flipped pixel (step 707), a determination is made whether it is isolated or part of a small isolated group (step 708). Specifically, if a candidate pixel or pixels fall into one of the patterns shown in FIG. 10, then the candidate pixel or pixels are considered isolated and the color of each is flipped (step 709). In FIG. 10, the candidate pixels for flipping are marked 'C' and the non-candidates (those pixels not poorly predicted) are marked 'N'. As can be noted, the candidate pixel or pixels in FIG. 10 are surrounded by non-candidates and thus are considered "isolated" mismatched pixels. After reversing the color of the isolated mismatched pixels, the mark is coded as in the previously described lossless case, using the 11-pixel template consisting of four pixels from the current mark and seven pixels from the matching mark as shown in FIG. 6.

The same principle of pixel flipping is applied to improve the compression of marks with no acceptable matching mark. Thus, after no acceptable match is found in step 404, each pixel in the bitmap of the current mark is examined (step 720). A determination of whether a pixel is or is not well predicted is approximated from its neighbor pixels above it and to its left. If the pixel is the same as either of these neighbors it is considered well predicted (step 721). Only if it differs from both of these neighbors is it considered poorly predicted and made a candidate for flipping by tentatively flipping it (step 722). The tentatively flipped candidate pixels (step 723) are actually reversed only if they are "isolated" in the same sense shown in FIG. 10. After flipping the color of the isolated mismatched pixels (step 724), the mark is coded as in the previously described lossless case, using the 10-pixel template of FIG. 2 containing only pixels from the current mark.

The particular algorithm described for determining whether a poorly predicted pixel is part of an isolated group and should be permanently reversed in color is illustrative and various other algorithms could be used in its place. Similarly, the context template used for pixels in the current mark and matching mark when an acceptable matching mark is found is also illustrative and other templates that include pixels in both the current and matching mark could also be used.

Also, as described hereinabove, the QM-Coder used in the JBIG standard is used to code each pixel in the image. Other statistical coders which code each pixel based on both its value and the set of probabilities of all possible values could also be used. Furthermore, the present invention is not limited to bilevel images but could also be applied to multi-resolution images in which each pixel in the image is represented by more than one bit. In this case, the values of selected pixels which are poorly predicted would be selectively modified to more probable values if their modification would not significantly distort the image. Even further, the present invention could be applied to any digitally sampled analog signal which requires compression and which need not be exactly reproduced bit-by-bit. In such an embodiment, the value of selected samples to be coded by means of a statistical encoder and whose probability of occurrence of such value can be determined to be less than the probabilities of occurrence of other value or values, would be modified to a more probable value so as to reduce the overall length of the encoded bit stream that represents the analog signal.

The above-described embodiment is illustrative of the principles of the present invention. Other embodiments could be devised by those skilled in the art without departing from the spirit and scope of the present invention.

The invention claimed is:

1. A method for compressing the length of a bitstream representing coded samples of a digitally sampled analog signal in a system which encodes each sample of the analog signal using a statistical coder that codes each sample based on the value of the sample and the set of probabilities of all possible sample values, the method comprising the step of:

modifying to a more probable value an actual value of a selected sample whose probability of occurrence of such actual value is less than the probability of occurrence of at least one other possible value.

2. The method of claim 1 further comprising the steps of (1) prior to modifying an actual value of a selected sample to the more probable value, determining whether an encoded signal that would be converted back to an analog signal using the more probable value of the selected sample would be imperceptibly different from the original digitally sampled analog signal; and (2) modifying the selected sample to the more probable value only if the converted back analog signal would be imperceptibly different from the original digitally sampled analog signal.

3. A method for compressing a digitally sampled original image in which one or more bits represent the value of each pixel in the image, each pixel being coded using a statistical coding method that codes each pixel based on the value of the pixel and the set of probabilities of all possible pixel values, the method comprising the step of:

modifying to a more probable value an actual value of at least one selected pixel whose probability of occurrence of such actual value is less than the probability of occurrence of at least one other possible value.

4. The method of claim 3 further comprising the steps of (1) prior to modifying an actual value of a selected pixel to the more probable value, determining whether an image that would be recreated from the modified value of the selected pixel would be imperceptibly different from the original image; and (2) modifying the value of the pixel only if the recreated image would be imperceptibly different from the original image.

5. The method of claim 4 wherein the step of determining whether an image that would be created from the modified value of the selected pixel would be imperceptibly different from the original image comprises the step of determining whether the selected pixel is isolated from other selected pixels or is one of a small group of selected pixels which are isolated from other selected pixels.

6. A method for compressing a bilevel image of textual information, the bilevel image being scanned into black and white pixels, the method comprising the steps of:

segmenting the pixels of the image into marks;

comparing the pixels from a current mark with the pixels in a set of marks in a library of marks;

determining whether the current mark matches one of the marks in the library of marks using a predetermined measure of acceptability;

if the current mark matches one of the marks in the library, coding an index of the matching mark and comparing the pixels in the current mark with the pixels in the matching mark;

for each pixel from the current mark that does not match a corresponding pixel in the matching mark, tentatively flipping the value of the pixel;

for each tentatively flipped pixel from the current mark, determining whether the pixel is isolated from other tentatively flipped pixels from the current mark or part of a small isolated group of pixels that are separated from other tentatively flipped pixels from the current mark;

permanently flipping the value of each tentatively flipped pixel from the current mark that is isolated or part of a small isolated group; and coding each permanently flipped pixel value from the current mark using a statistical coding method.

7. The method of claim 6 wherein the statistical coding method for each permanently flipped pixel value from the current mark comprises the steps of:

determining a context of each pixel;

determining a probability associated with the determined context of each pixel; and coding the value of each pixel based on both the probability associated with the context of the pixel and an actual value of the pixel.

8. The method of claim 7 wherein the context of each pixel is determined by the values of selected pixels from the current mark surrounding the pixel being coded and the values of selected pixels in the matching mark including and surrounding the pixel corresponding to the pixel being coded.

9. The method of claim 8 wherein an arithmetic coder is used to code the value of each pixel based on its value and its context.

10. The method of claim 8 further comprising the step of adding the current mark to the library of marks if the current mark and the matching mark differ by more that a measurably determinable predetermined difference.

11. The method of claim 6, wherein if the current mark does not match one of the marks in the library, the method further comprises the steps of:

determining for each pixel in the current non-matching mark whether the pixel is the same as a predetermined number of preselected neighbor pixels;

if the pixel is not the same as said predetermined number of preselected neighbor pixels, tentatively flipping the value of the pixel;

for each tentatively flipped pixel in the current non-matching mark, determining whether the pixel is isolated from other tentatively flipped pixels in the current non-matching mark or part of a small isolated group of pixels that are separated from other tentatively flipped pixels in the current non-matching mark permanently flipping the value of each tentatively flipped pixel in the current non-matching mark that is isolated or part of a small isolated group; and coding each permanently flipped pixel value in the current non-matching mark using a statistical coding method.

12. The method of claim 11 wherein the statistical coding method for each pixel in the current non-matching mark comprises the steps of:

determining a context of each pixel;

determining a probability associated with the determined context of each pixel; and coding the value of each pixel based on both the probability associated with the context of the pixel and an actual value of the pixel.

13. The method of claim 12 wherein the context of a pixel in the current non-matching mark is determined by the values of selected pixels surrounding the pixel being coded.

14. The method of claim 13 wherein an arithmetic coder is used to code the value of each pixel based on its value and its context.

15. The method of claim 13 further comprising the step of adding the current non-matching mark to the library of marks.

16. The method of claim 6 further comprising the step of ignoring a mark if its size is below a predetermined threshold.

17. The method of claim 6 further comprising the step of smoothing the edges of a mark.

18. The method of claim 17 wherein the step of smoothing the edges of a mark comprises the step of removing single protruding pixels along edges of the mark.

* * * * *